(12) United States Patent
Floyd et al.

(10) Patent No.: US 7,526,396 B2
(45) Date of Patent: Apr. 28, 2009

(54) METHOD FOR DETERMINING TREATABILITY OF A WOOD PRODUCT

(75) Inventors: Stanley L. Floyd, Enumclaw, WA (US); Y. Carol Miltimore, Enumclaw, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 187 days.

(21) Appl. No.: 11/394,590

(22) Filed: Mar. 31, 2006

(65) Prior Publication Data
US 2007/0233393 A1 Oct. 4, 2007

(51) Int. Cl.
*G06F 15/00* (2006.01)

(52) U.S. Cl. .......................... 702/81; 702/159; 702/183

(58) Field of Classification Search .................. 702/81, 702/155, 183, 189, 159; 73/73, 597, 866
See application file for complete search history.

(56) References Cited

U.S. PATENT DOCUMENTS 6,072,890 A * 6/2000 Savard et al. ............... 382/110
6,119,364 A * 9/2000 Elder .......................... 34/212

* cited by examiner

*Primary Examiner*—Drew A Dunn
*Assistant Examiner*—Hien X Vo
(74) *Attorney, Agent, or Firm*—Weyerhaeuser Intellectual Property Department

(57) ABSTRACT

A method for determining potential uptake and/or potential penetration of a liquid and/or chemical within a wood product is provided. The methods involve the use of single and/or multiple sensor group systems to provide qualitative and/or quantitative estimates of uptake and/or penetration. Properties measured and/or detected by the sensor groups are inputted to an algorithm for determining treatability of the wood product.

23 Claims, 10 Drawing Sheets

Figure 5
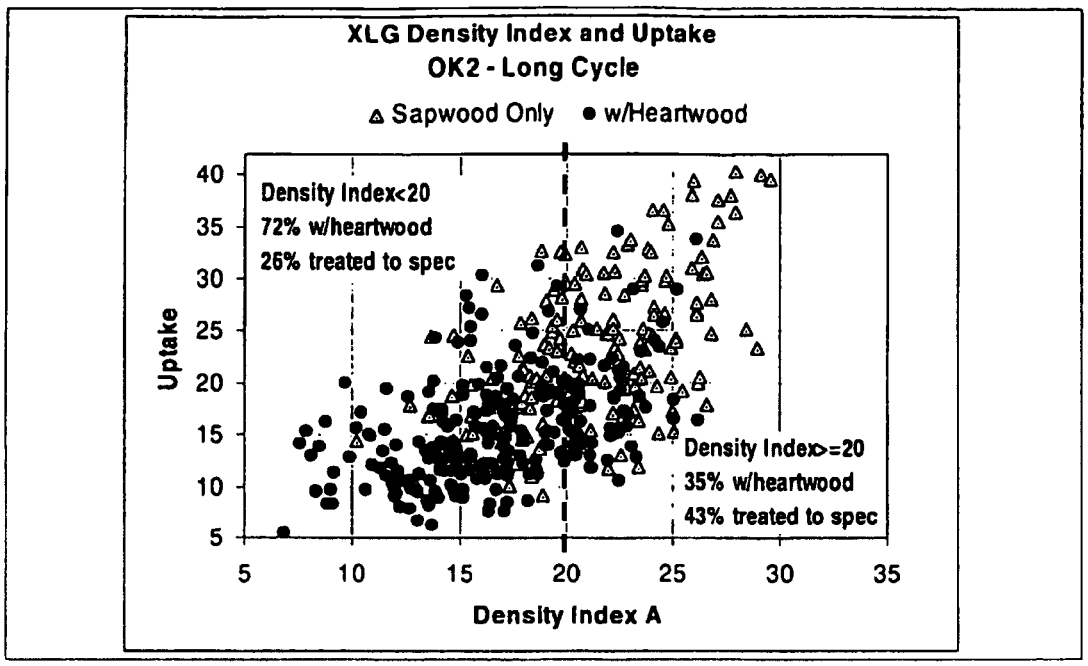
Figure 6
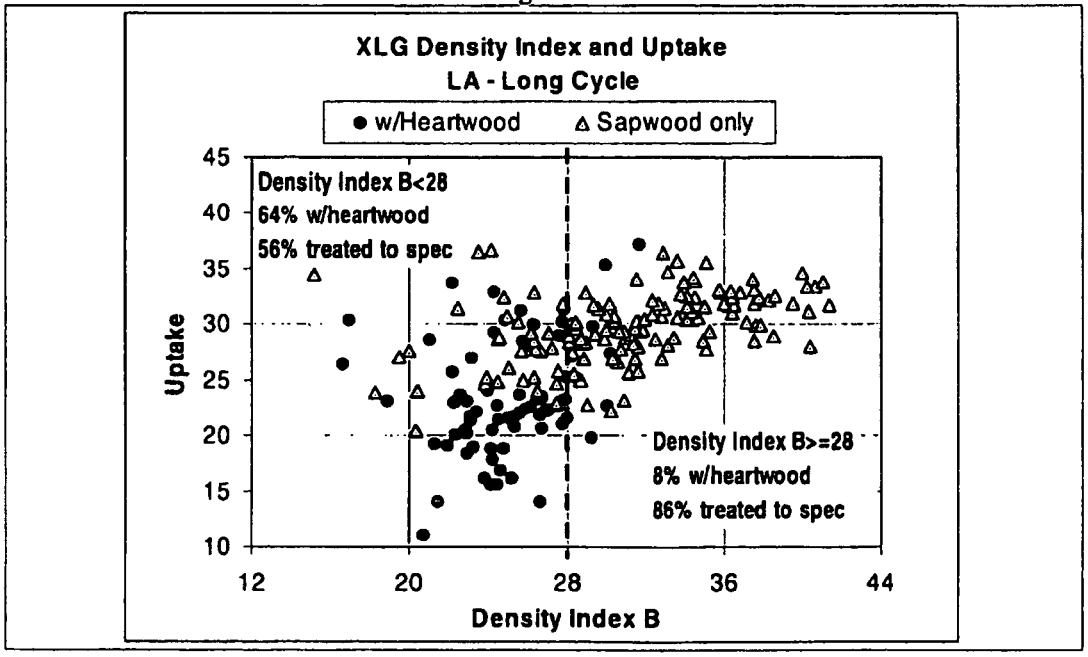
Figure 7
XLG Density Profile of a 2x4x16 Test Board A drawing showing how 4-ft treating samples were taken and marked NIR Relative Absorbance vs. Wave Length of a 4-ft Test Sample

METHOD FOR DETERMINING TREATABILITY OF A WOOD PRODUCT

FIELD OF THE INVENTION

This invention relates generally to a method for determining an ability of a wood product to absorb a chemical treatment.

BACKGROUND OF THE INVENTION

Wood treatment with chemical preservatives is generally known. When the chemical treatment is applied, there are two types of treatability phenomena to consider. A first phenomenon is uptake. This can be defined as an amount of liquid that may be absorbed over a specified period of time over a specified cycle. A cycle may be characterized by an amount and duration of pressure and/or vacuum provided in the treating environment. A second phenomenon is penetration. This may be defined as the depth of absorption of liquid into the wood over a specified time and over a specified cycle.

Most properties of wood are highly variable. When a collection of multiple wood pieces are combined in a batch treating process, the natural variability in chemical uptake rate results in some pieces absorbing more chemical than necessary and others absorbing less chemical than necessary for effective treatment. A second problem is that cycle times may be extended beyond what is necessary for the wood to receive adequate treatment. Both of these problems can occur because the manufacturer is uncertain as far as knowing the wood piece's ability to receive the treatment. This results in additional and unnecessary costs to the manufacturer.

Accordingly, a need exists for a method to determine the treatability of wood products.

BRIEF DESCRIPTION OF THE DRAWINGS

The embodiments of the present invention are described in detail below with reference to the following drawings.

FIG. 5 is a plot of a density index vs. uptake;

FIG. 6 is a plot of a density index vs. uptake;

DETAILED DESCRIPTION OF THE INVENTION

Figure 1:
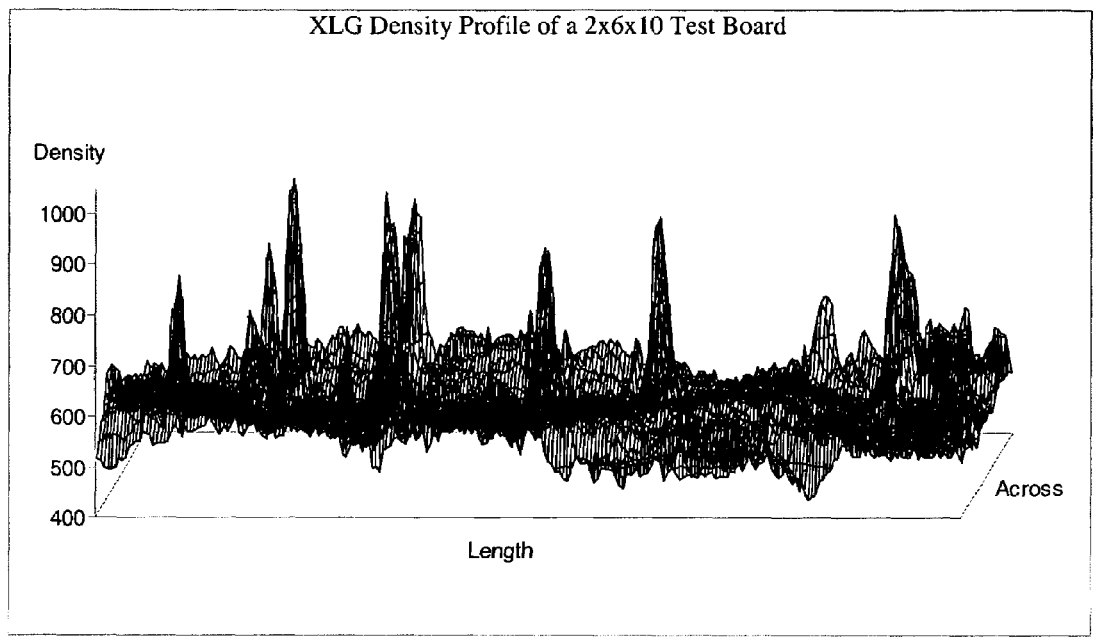
FIG. 1 is a plot of a XLG Density Profile of a 2×6×10 Test Board.

The present invention generally relates to a method for determining potential uptake and/or potential penetration of a liquid and/or chemical within a wood product. The liquid may be a carrier for one or more chemicals. The term "wood product" may be interpreted to mean lumber, poles, timbers, veneered products, strand products, engineered products, logs, other types of lumber, or the like. The methods involve the use of single and/or multiple sensor group systems to provide qualitative and/or quantitative estimates of uptake and/or penetration. Estimates can be much improved when an assortment of measurements are used together, where each measurement contributes information relating to one or more variables. The measurements may be taken at one or more sections of the wood product, which may differ in size given a particular embodiment. The properties observed at the one or more sections may allow a qualitative and/or quantitative estimate of uptake and/or penetration of a region of interest. In a first embodiment, the region of interest may be a portion of the wood product. In another embodiment, the region of interest may overlap with one or more sections of the wood product. In another embodiment, the region of interest may be the entire wood product. In yet another embodiment, the region of interest may be the same as the one or more sections detected by the sensor group(s). In another embodiment, the region of interest does not have an overlap with the one or more sections. Various properties which may be assessed within a region of interest include chemical uptake, depth of penetration, heartwood content, any combination of these, or any other related properties which are mentioned below.

In an embodiment of the present invention, a classification algorithm may be created to classify a wood product into one of a plurality of groups or categories. The groups may be based on qualitative or quantitative characteristics. For example, in an embodiment, the categories may be different grades of treatability. The classification of the wood products may require inputs from one or more sensor groups detecting properties of the wood products. The sensor groups may be a part of those systems known for analyzing a wood product (see U.S. Pat. Nos. 6,308,571; 6,305,224; and 6,293,152 to Stanish et al.) The technologies for these systems are known by those skilled in the art and include, but are not limited to, finite element modeling. For example, the sensor groups may obtain chemical pattern measurement, density measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement, spectral measurement and/or defect maps. Structural property measurement may measure modulus of elasticity, density, specific gravity, strength, or a combination of these. Density measurement may be done via, for example, x-ray, gamma radiation, microwave radiation, radio frequency radiation, weight measurement, nuclear magnetic resonance, near infrared spectroscopy, or other methods known to those skilled in the art. Wood chemistry measurement may be performed via near infrared spectroscopy, light scattering, color examination, ultraviolet radiation, infrared, visible, or other methods contemplated by those skilled in the art. Acousto-ultrasonic property measurement measures may measure velocity and/or damping. The spectral measurement may be characterized by absorption or reflectance values over a wavelength spectrum ranging from ultraviolet through near infrared.

Those skilled in the art will recognize that many of the sensors identified above can be used in a tomographic imaging configuration enabling 3-dimensional internal measurements of an object to be obtained. Examples of the sensor groups having such tomographic imaging potential include sensors for detection of electrical/electromagnetic properties, magnetic resonance properties, acousto-ultrasonic properties and density properties. If these sensor groups are applied in a tomographic configuration, the invention described herein can be utilized to predict patterns of liquid uptake and penetration within a large 3-dimensional object such as a log or cant. That prediction can then be used to influence subsequent manufacturing of the log or cant (example: if the core of a log is predicted to be impermeable, that log will not be cut into lumber sizes targeted for a treated decking application).

Using this approach, the prediction model or algorithm of the present invention may use inputs of many different resolution scales. Some examples are density measured every inch across the width and every inch along the length of the board, board average MOE, moisture content measured in one foot increments along the length of the board, spectroscopy data collected every inch along the board length and every 0.1 inch across the width. The inputs are functions of the sensor signals and may be either quantitative or qualitative. For example, an input could be the estimated moisture content for each 12 inch lineal section of a piece of lumber, as estimated by a moisture meter. Another example is an indicator for the presence or absence of a knot in a 12 inch by 1 inch section of wood, based on a color image. Another example is an indicator for the presence or absence of heartwood every 2 ft section of wood, based on a density profile. Inputs may be direct sensor measurements, pre-processed signals, combined signals from several sensors or predicted measures from other sensors. Signal pre-processing may include, but is not limited to, such steps as filtering, smoothing, derivative calculations, power spectrum calculations, Fourier transforms, etc., as is well known in the art.

The prediction algorithm(s) or model(s) based on the set of inputs can be derived using many techniques which include, but are not limited to, regression trees, classification trees, linear discriminant analysis, quadratic discriminant analysis, logistic regression, Partial Least Squares or other supervised learning techniques such as neural networks. There are many forms of equations or algorithms that could be used, and a general reference is Hastie, et al[1].

[1] Hastie, T., Tibshirani, R., and Friedman, J., (2001) The Elements of Statistical Learning, Springer, New York.

These algorithms can be developed to classify boards into 2 or more groups. For example, boards might be classified into four grades of treatability (#1 grade, #2 grade, #3 grade, #4 grade) or into two classifications (low treatability and high treatability), or into three categories (long cycle, intermediate cycle and short cycle). Typically, the parameters in the models or algorithms are derived from a training-set of data and the performance is tested on a testing-set of data before being used in production, although other approaches are contemplated.

Various embodiments are contemplated involving the use of sensor groups and algorithms. In a first embodiment, a single sensor group may provide inputs to a classification algorithm which classifies wood products into one of a plurality of groups or categories, such as grades, for example.

In a second embodiment, a single sensor group may provide inputs to a classification algorithm as in the previous example. However, in this embodiment, a second algorithm may be selected after classifying the wood product. This second algorithm may be selected from a plurality of algorithms which are used to assess the treatability in a quantitative manner.

In a third embodiment, two or more sensor groups may provide two or more inputs to a classification algorithm to classify wood products into one of a plurality of categories.

In a fourth embodiment, two or more sensor groups may provide two or more inputs to an algorithm for providing a quantitative assessment of treatability of wood products.

In a fifth embodiment, two or more sensor groups may provide two or more inputs to a classification algorithm to classify wood products into one of a plurality of categories. Next, a second algorithm may be selected after classifying the wood product. This second algorithm may be selected from a plurality of algorithms which are used to assess the treatability in a quantitative manner.

In an embodiment, a method is provided for determining liquid uptake potential in a wood product. The method comprises the steps of: creating an algorithm for correlating one or more detected properties of the wood product to heartwood content for the wood product; detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps; inputting the one or more detected properties to the algorithm to get the correlated heartwood content; and determining the liquid uptake potential based on the correlated heartwood content. In an embodiment, the liquid uptake potential is determined by a second algorithm which takes into account the correlated heartwood content. In another embodiment, the second algorithm provides a qualitative estimate of the liquid uptake. In yet another embodiment, the second algorithm provides a quantitative estimate of the liquid uptake.

In another embodiment, a method is provided for determining potential penetration of a liquid into a wood product. The method comprises the steps of: creating an algorithm for correlating one or more detected properties of the wood product to heartwood content for the wood product; detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps; inputting the one or more detected properties to the algorithm to get the correlated heartwood content; and determining the liquid penetration potential based on the correlated heartwood content. In an embodiment, the potential penetration of the liquid into the wood product is determined by a second algorithm which takes into account the correlated heartwood content. In another embodiment, the second algorithm provides a qualitative estimate of the potential penetration of the liquid into the wood product. In yet another embodiment, the second algorithm provides a quantitative estimate of the potential penetration of the liquid into the wood product.

It is further contemplated that treatability (i.e uptake potential and/or penetration potential) may assist in determining how a raw material, such as a stem, log, or the like, may be subsequently manufactured into a wood product (i.e., board, log, etc.). For example, predictions of treatability patterns may provide information which leads the manufacturer to trim low uptake segments from lumber ends. In another example, log cutting patterns could be applied to a raw material based on treatability patterns predicted from sensors arranged in a tomographic configuration. The treatability determination could be based on examination by sensor groups of one or more regions of interest in the raw material. The data from these regions of interest could be used to decide how to subsequently manufacture the raw material.

Accordingly, in an embodiment, a method is provided for manufacturing a wood product from a raw material. The method comprises the steps of: creating an algorithm for correlating one or more detected properties of one or more regions of interest in the raw material to treatability for the raw material; detecting the one or more properties of the one or more regions of interest wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps; inputting the one or more detected properties to the algorithm to determine the treatability of the raw material; and manufacturing the wood product from the raw material based on the treatability. In an embodiment, the treatability is liquid uptake potential. In another embodiment, the treatability is liquid penetration potential.

The following examples illustrate how lumber samples were examined for treatability:

EXAMPLE 1

A treating test was conducted with an objective to determine if density data obtained from x-ray measurement can be used to predict an amount of chemical uptake. Southern pine lumber samples having dimensions of 2×6×10 feet and 2×6×16 feet were collected from a Lousiana mill (LA) and two Oklahoma mills ((OK1 & OK2) owned by Weyerhaeuser Company. Lumber collected from the OK2 mill was identified as being of a natural stand source (older wood source) and plantation source (younger wood source). This lumber was run through an X-Ray Lumber Gauge (XLG module manufactured by COE/Newnes). Density (x-ray) profile data was acquired and is illustrated in (FIG. 1).

The lumber was then treated with alkaline copper quaternary (ACQ) using two treatment schedules. The first was a conventional 6 minute schedule (referred to as Long Cycle) and the second was an accelerated 3 minute schedule (referred to as Short Cycle).

Uptake and penetration were measured after treatment. Uptake was determined from a difference between the weight before treatment and the weight after treatment. Penetration was measured from cross sections cut 1 foot from the end of the boards. An amount of heartwood was also assessed from these cross sections.

Figure 2:
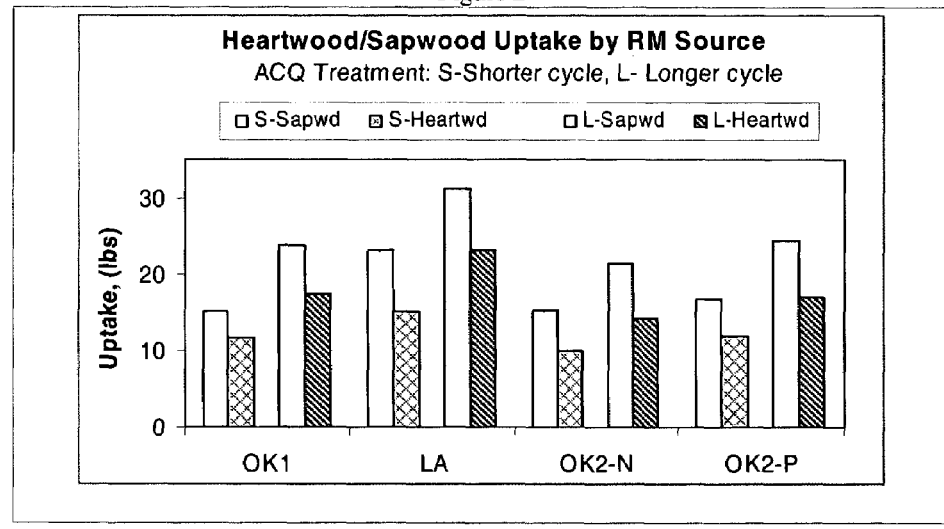
FIG. 2 is a chart of uptake for a short cycle and a long cycle for wood products having heartwood and/or sapwood.

An initial look at the data showed a difference in treatability 1) depending on the amount of heartwood present, 2) between raw material sources (regional), and 3) by raw material age (natural stand source vs. plantation source.) Heartwood-containing lumber had significantly lower uptake than lumber composed of all sapwood for all mill groups and for both treating conditions. Average uptake of lumber from the LA mill was significantly higher than average uptake of lumber from other mills for both treating conditions. Average uptake of lumber cut from plantation timber had higher uptake than lumber cut from natural stand timber. This is demonstrated in the data in Table 1 below as well as FIG. 2.

TABLE 1

| Lumber from: | Avg Uptake of Lumber Treated in Short Cycle | | Avg Uptake of Lumber Treated in Long Cycle | |
|---|---|---|---|---|
| | All sapwood | w/Heartwood | All sapwood | w/Heartwood |
| OK1 | 15.03 | 11.63 | 23.73 | 17.39 |
| LA | 23.03 | 15.05 | 31.15 | 23.19 |
| OK2-N | 15.18 | 9.92 | 21.49 | 14.24 |
| OK2-P | 16.69 | 11.86 | 24.36 | 16.98 |

XLG density profile data were averaged and reduced to 5 strips across the width of each 2×6 foot piece. A number of variables were generated from the reduced XLG density profile to develop a prediction model for uptake. Some of the key variables are shown in Table 2:

TABLE 2

| | |
|---|---|
| % w/>.06 diff | % of area with density difference >0.06 |
| Ttl #of spikes | Total number of all spikes (16 ft equiv.) |
| TtlSpikeArea | Area covered by significant spikes (16 ft equiv.) |
| % w/>.10 diff | % of area with density difference >0.10 |
| HEDens SD | Density variation (std. dev.) of one half of the board w/higher avg density |
| AvBGRange | Cross direction density range for background (non-spike area) |
| CenterDens | % of area with density difference >0.06 |
| Est SpGr | Sp. Gr. estimated by adjusting density for MC |
| Ttl Spike vol | Cum density incr from significant spikes (16 ft equiv.) |
| DensitySD | Density variation (std. dev.) |
| RefDen SD | Reference density (clearwood density) variation (std. dev.) |

Regression and general linear model ("GLM") procedures in statistical analysis software ("SAS") (provided by SAS Institute, Inc.) were used for developing prediction equations for uptake using XLG density data. The exact form of the variables that correlated well with uptake and/or were useful as predictors varied by lumber mill group. Generally, however, they reflected the number of spikes, length wise density difference/variation, average and variation of reference density.

Figure 3:
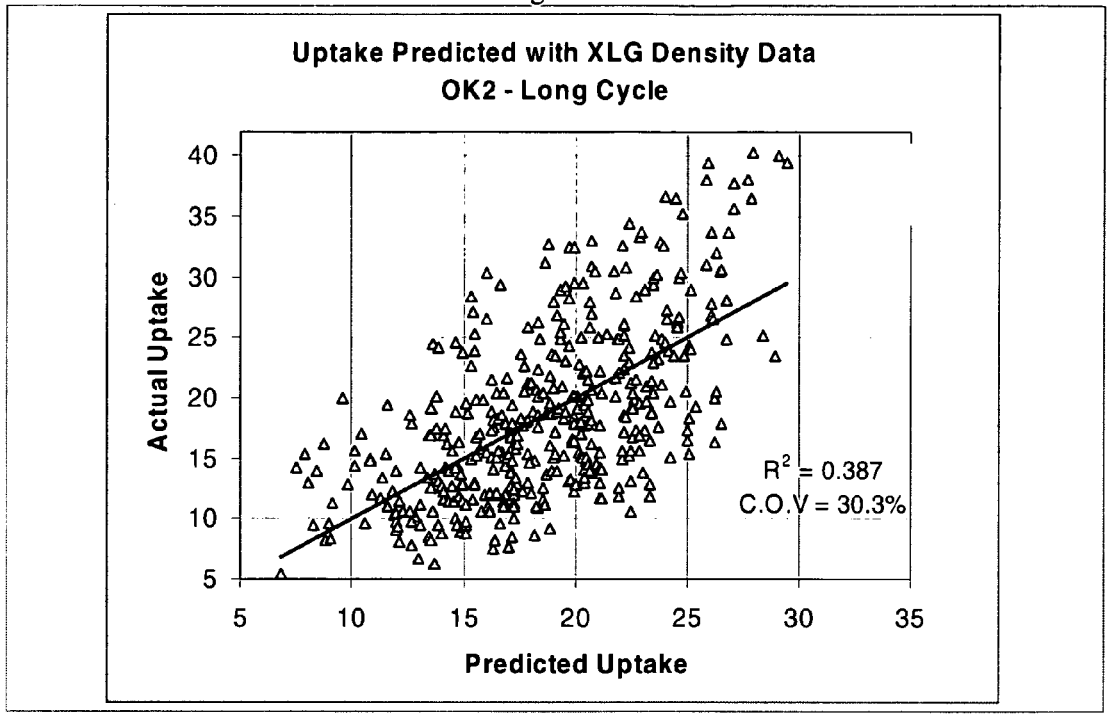
FIG. 3 is a plot of predicted uptake vs. actual uptake where the uptake is predicted using XLG data.
Figure 4:
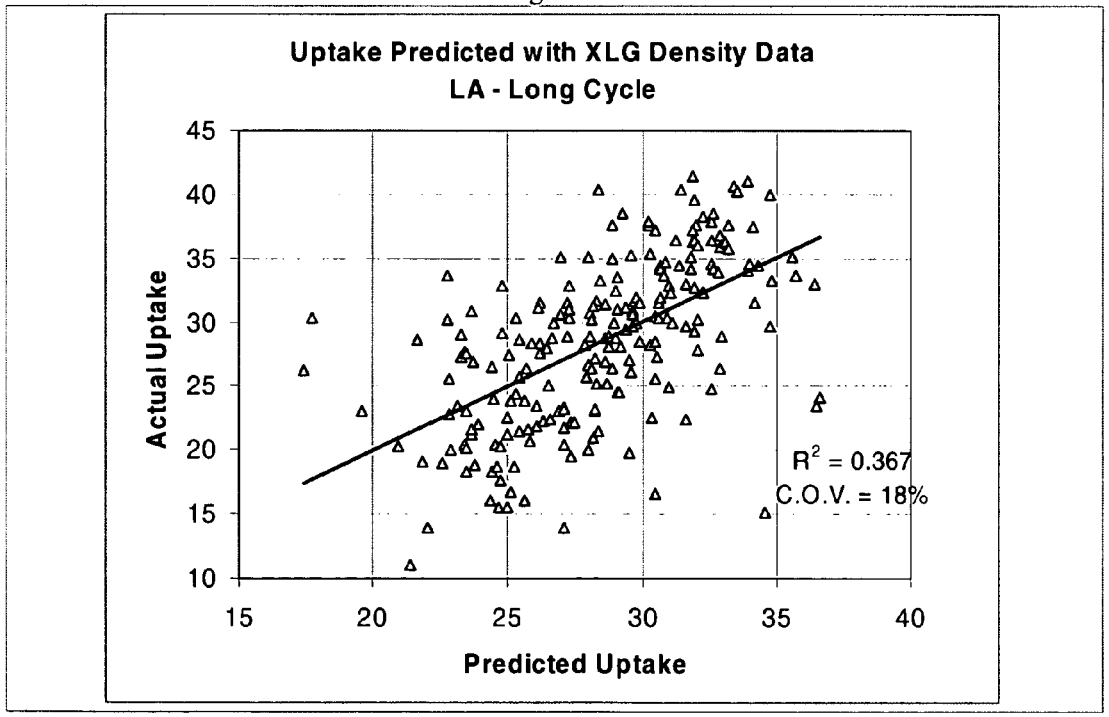
FIG. 4 is a plot of predicted uptake vs. actual uptake where the uptake is predicted using XLG data.

As an example, a combination of four variables explained 39% of the uptake variation in OK2 lumber treated using the long cycle. The combination included number of density spikes, average density, average clearwood density and density variation at end with higher density as shown in FIG. 3. A different combination of four variables (number of density spikes, density difference between two halves, area with density difference >0.06 and clearwood density variation)

accounted for 37% of uptake variation in LA lumber treated using the long cycle as shown in FIG. 4.

EXAMPLE 2

The data from Example 1 was also analyzed to determine how XLG density data can be used to sort the lumber for treatability. The same variables used for uptake predictions were combined into density indices and the test lumber was sorted into roughly equal batches using the various indices. Each of the two sorted batches was then further analyzed to obtain the proportion of heartwood/sapwood and proportion that met target penetration specification (85% of sapwood width). The results are displayed in FIG. 5 and FIG. 6. This exercise showed a good potential for using density data to sort lumber into batches which are more and less likely to have heartwood. The batch less likely to have heartwood had the highest probability of meeting the target penetration specification.

EXAMPLE 3

Figure 7:
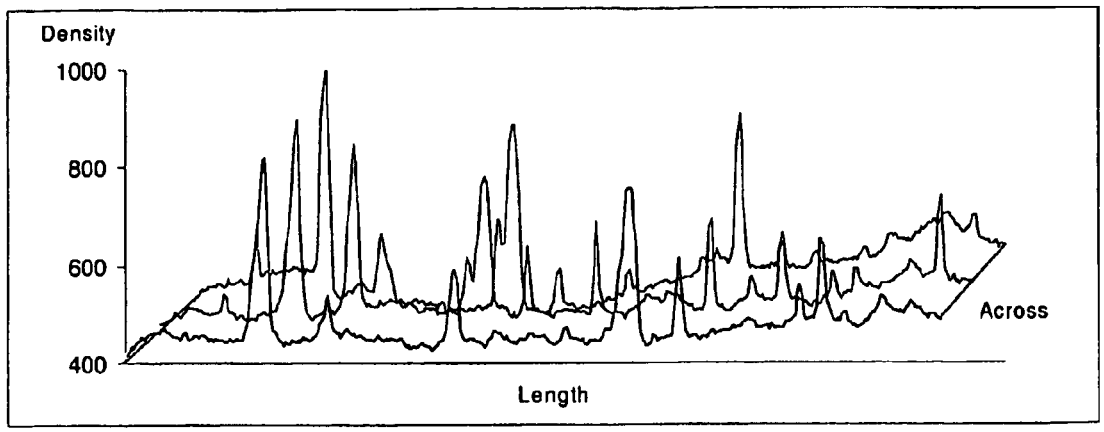
FIG. 7 is a plot of a XLG Density Profile of a 2×4×16 test board.

A treating test was conducted to determine if addition of near infrared (NIR) spectra improves the ability to predict lumber treatability (over models using density patterns). 128 mill run 2×4×16 foot boards, 64 from a Mississippi (MS) mill and 64 from an Arkansas (AR) mill, were used for the test. The test lumber was x-ray scanned with an XLG and their density profiles (3 strips across the width) were obtained (refer to FIG. 7 as an example). 16-ft length ultrasonic velocity was also collected on these boards.

Figure 8:
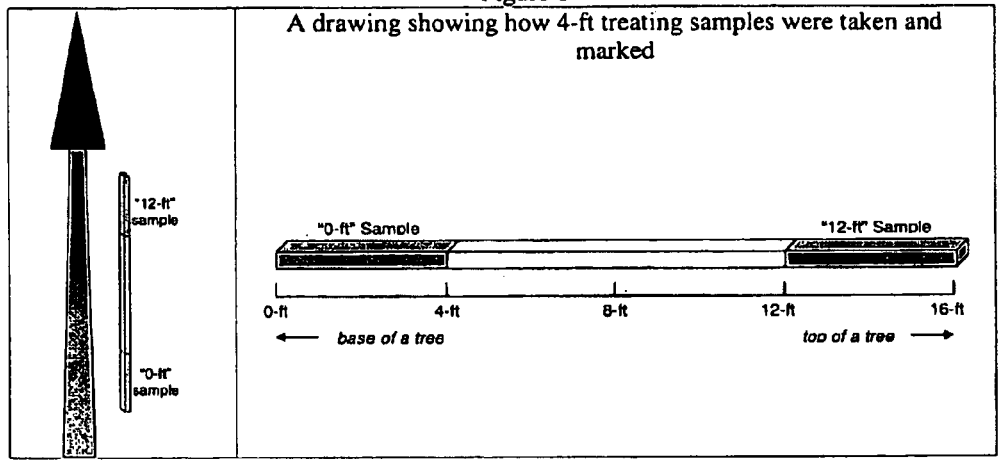
FIG. 8 is a diagram showing how 4-ft treating samples were taken and marked.
Figure 9:
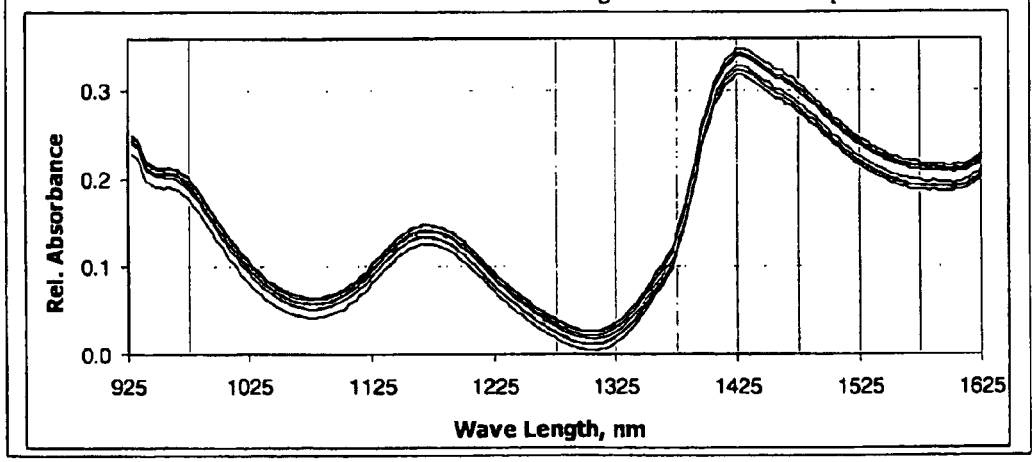
FIG. 9 is a plot of NIR Relative Absorbance vs. wave length of a 4-ft Test Sample.

Longitudinal orientation of boards relative to their originating standing tree were determined using an ultrasonic device (end having lowest acoustic velocity assumed to originate closer to base of tree). Two 4-ft 2×4 treating samples were cut from two ends of each board; the sample identified as being closer to the base of a tree was marked as a "0-ft" sample and the other as a "12-ft" sample as shown in FIG. 8. Additional data were collected on these samples including a Near Infrared ("NIR") spectroscopy scan:

Each face of the samples was planed and a near infrared (NIR) scan was taken (data range: wave length 929-1629 nm) at four locations on each side of the samples, each covering roughly 10 inches of the length. FIG. 9 provides an example of this. Spectral data was obtained using an imaging NIR camera (Alpha from Indigo Systems) fitted with a diffraction grating (Imspector from Specim). Each sample was marked with a form of identification and a digital image of each face was taken. The before-treatment weight was taken as well as a Ring count and the number of Rings per inch (RPI).

The 4-ft samples were treated with a preservative chemical, alkaline copper quaternary (ACQ), in a vacuum/pressure treating chamber. The test was planned to produce a wide range of treatment levels by under-treating to a target of 3 gallons (dilute chemical)/cubic feet (approximately 25 minutes with final vacuum at 25 inches Hg). Samples were treated in 3 charges; all using the same treating schedule. During the third charge, a vacuum seal broke, but the test was resumed and completed. AR samples and MS samples were not equally distributed among the three charges as shown in Table 3.

TABLE 3

|  | Charge 1 | Charge 2 | Charge 3 |
|---|---|---|---|
| MS Samples | 92 | 36 |  |
| AR Samples |  | 56 | 72 |

After treatment, additional measurements were taken on the 4 ft samples, including, Weight after treatment, (g); Sample width (each end), (mm); Heartwood & sapwood width (each end), (mm); and Penetration width (each end), (mm). In addition to the above data, a rough estimate of radial location and number of knots were extracted from the digital images taken.

For analysis, the three variables were defined as:

Uptake=weight before treatment−weight after treatment

% Penetration=(Average of two end penetration widths)/(Average of two end sapwood widths)×100

% Heartwood=(Average of two end heartwood widths)/(Average of two end widths)×100

Figure 10:
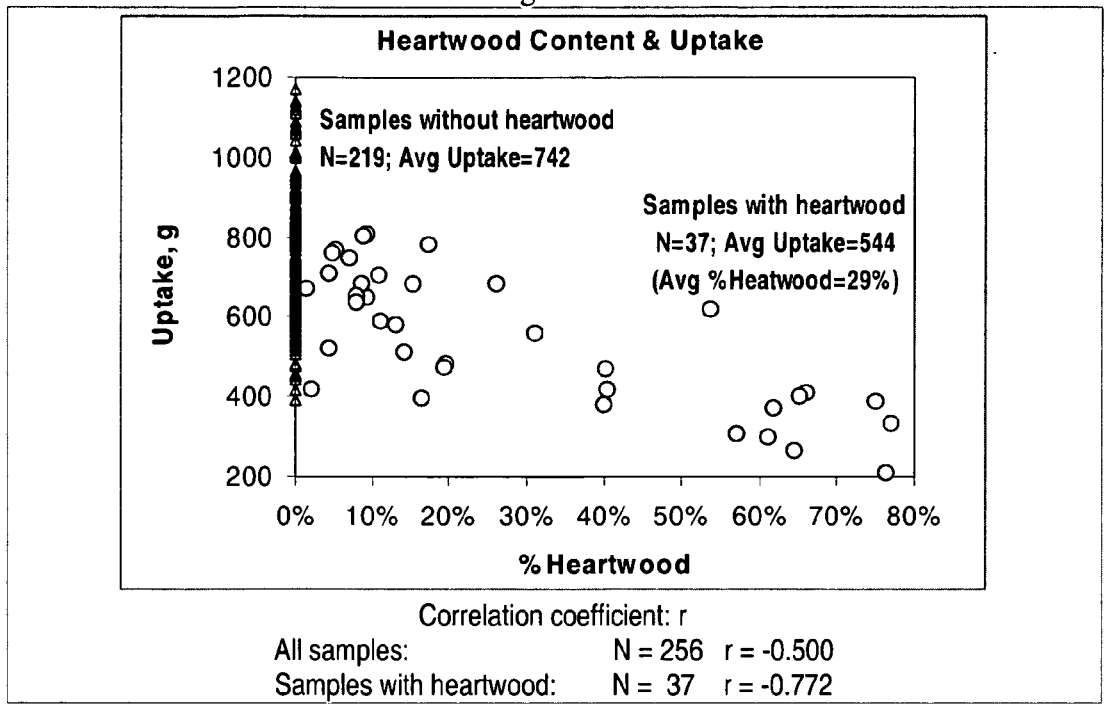
FIG. 10 is a plot of uptake vs. heartwood content.

Heartwood content is a variable of interest as it is known that heartwood is difficult to treat. These test samples confirmed the effect showing a good correlation between uptake and percent heartwood content, as shown in FIG. 10. The samples with heartwood had significantly lower uptake and penetration than all other samples. Average uptake of all test samples was 715 g. Average uptake for the 37 samples that contained heartwood was significantly lower than the average for the 219 samples that did not contain heartwood. Average penetration of the heartwood containing samples was also significantly lower than the average penetration of samples without heartwood. Although chemical is required to penetrate through sapwood only, the heartwood containing samples penetrated less of the sapwood width than samples without heartwood. This is shown in Table 4:

TABLE 4

|  | Samples without Heartwood | | | Samples with Heartwood | | |
|---|---|---|---|---|---|---|
|  | # Samples | Mean | Std. Dev. | # Samples | Mean | Std. Dev. |
| Uptake | 219 | 741.9 | 151.8 | 37 | 543.8 | 169.8 |
| Penetration, mm | 219 | 70.8 | 27.4 | 37 | 40.0 | 23.2 |
| Penetration, % of sapwood width | 219 | 77.6 | 30.0 | 37 | 62.7 | 26.7 |

Several variables (XLG variables) were generated from the XLG density profile and are shown in Table 5:

TABLE 5

| Density (overall) | Sample average overall density (in .0001) |
|---|---|
| Reference density | Sample average reference density - clearwood density excluding spikes (knots) (in .0001) |
| Density difference | Sample average difference between overall density and reference density |
| Density variation | Overall density variation (std. dev.) |
| Reference density variation | Reference density variation (std. dev.) |
| Density difference variation | Density difference variation (std. dev.) |
| # of density spikes | Total number of significant density spikes (4 ft equiv.) |
| Total density spike area | Area covered by significant spikes (16 ft equiv.) |
| Total density spike vol | Cum density increase from significant spikes |
| Total density spike height | Cum max height (density) of significant density spikes |
| % area w/>.10 density diff | % of area with density difference >0.10 |

Of the XLG variables, number of density spikes and percentage area with density difference>0.10 correlated best with uptake, penetration and percentage heartwood (|r|=0.22 to 0.47). All three variables correlated negatively with uptake and penetration and positively with percentage heartwood. Correlations were strongest for percentage heartwood.

The 4-ft treated sample data were combined as "board" data and they were analyzed to estimate combined uptake with XLG variables using multiple linear regression in SAS software. One extremely high uptake board was excluded from the analysis as an outlier.

Figure 11:
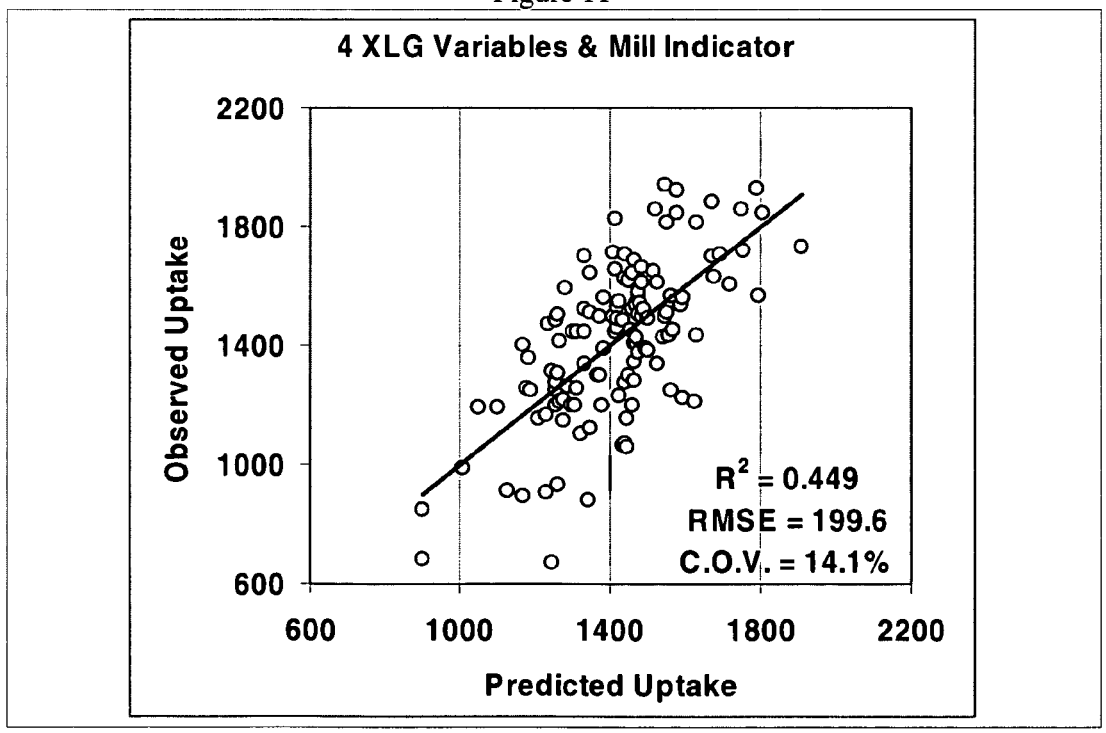
FIG. 11 is a plot of predicted uptake vs. actual uptake.

Total number of density spikes was the best single predictor of the board uptake, explaining 21% of the uptake variation. Other XLG variables that correlated were all variations of density spike patterns. Mill indicator was also a significant factor, improving the model significantly as seen in Table 6. A model with 4 XLG variables and mill indicator accounted for 45% of the uptake variation. This data is shown in FIG. 11.

Figure 14:
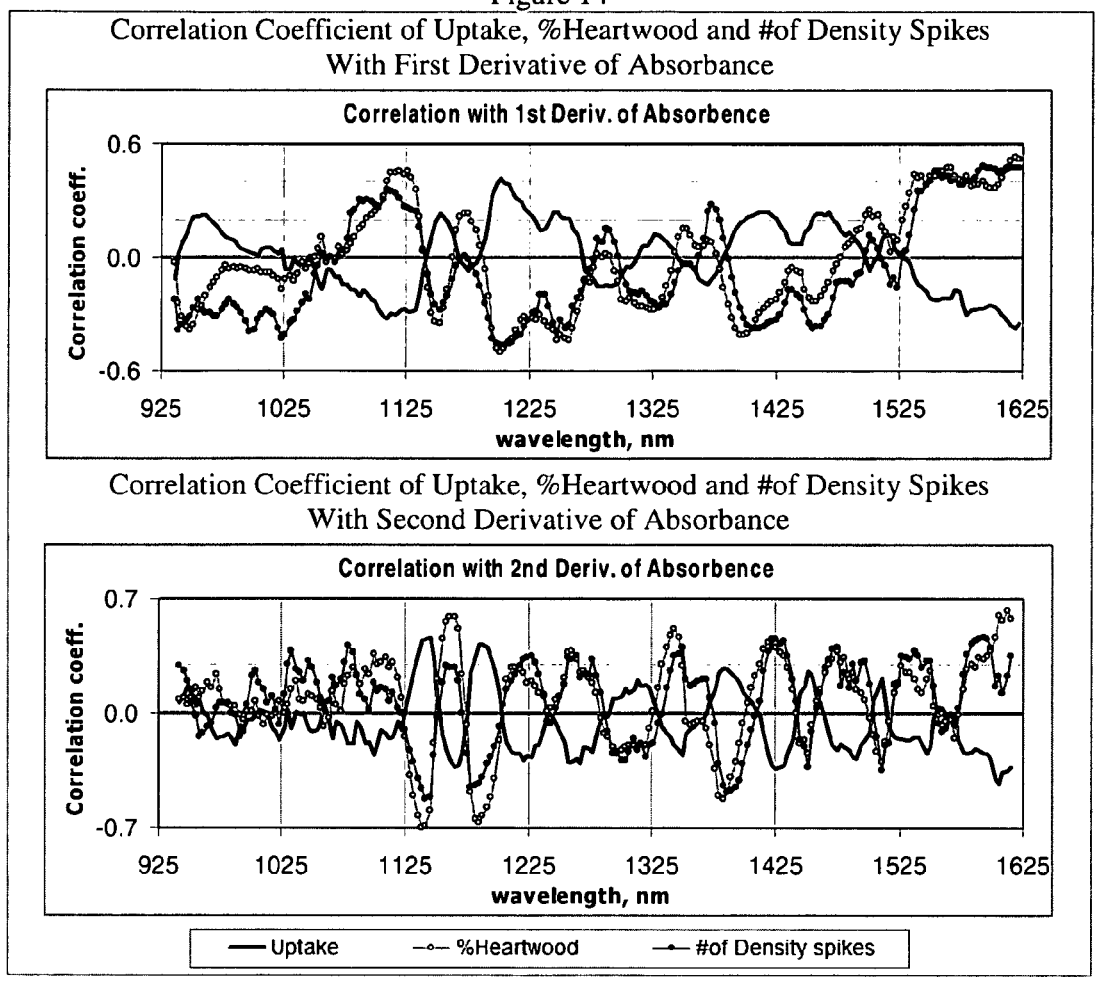
FIG. 14 are plots of Correlation Coefficient of Uptake, Percentage Heartwood and Number of Density Spikes with First Derivative of Absorbance and Second Derivative of Absorbance.
Figure 15:
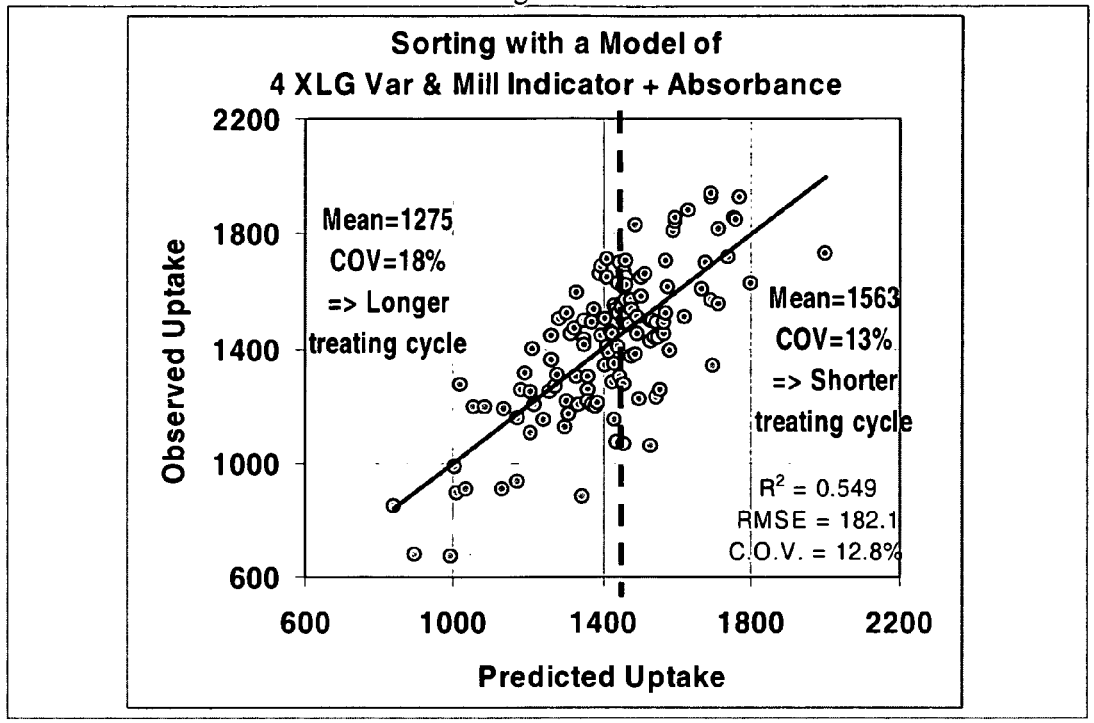
FIG. 15 is a plot of predicted uptake vs. actual uptake.

In examining correlation between absorbance data and uptake, it was noted that correlation patterns of the 1st and 2nd derivatives with uptake across the wave length spectrum were similar to their correlation patterns with % heartwood and number of density spikes, except that the signs were opposite. For example, the 1st derivative of absorbance at 1200 nm wave length had a correlation of about 0.4 with uptake while it had correlation of about −0.4 with % heartwood and number of density spikes as seen in FIG. 14.

Analysis of the original absorbance data showed that no single wavelength correlated significantly with uptake. However, original absorbance variables at two or more wave lengths combined did correlate significantly with uptake. Adding these absorbance variables to the models with XLG density variables described in Table 2 significantly improved the models, reducing prediction error by 9%. Original absor-

TABLE 6

| Predicting Uptake | Models without Mill Group | | | Include Mill Indicator | | |
|---|---|---|---|---|---|---|
| | $R^2$ | RMSE | C.O.V. | $R^2$ | RMSE | C.O.V. |
| Single XLG variable | | | | | | |
| total # of dens spikes | 0.213 | 230.6 | 16.2% | 0.289 | 220.2 | 15.5% |
| # of density spikes - "12-ft" samples | 0.163 | 237.9 | 16.8% | 0.225 | 229.9 | 16.2% |
| # of density spikes - "0-ft" samples | 0.159 | 238.5 | 16.8% | 0.262 | 224.4 | 15.8% |
| cum. max spike height - "0-ft" samples | 0.124 | 243.4 | 17.1% | 0.236 | 228.2 | 16.1% |
| avg % Area with dens diff >0.10 | 0.082 | 249.1 | 17.5% | 0.215 | 231.3 | 16.3% |
| Multiple XLG variables | | | | | | |
| total # of dens spikes clearwood density-"12-ft" samples | 0.248 | 226.4 | 15.9% | 0.373 | 208.5 | 14.7% |
| total # of dens spikes clearwood density-"12-ft" samples, density variation-"0-ft" samples | 0.262 | 225.0 | 15.9% | 0.406 | 204.6 | 14.4% |
| Total # of dens spikes, % Area with dens diff >0.10-"0-ft" samples, Avg overall density, Avg clearwood density | 0.326 | 216.1 | 15.2% | 0.449 | 199.6 | 14.1% |

Figure 12:
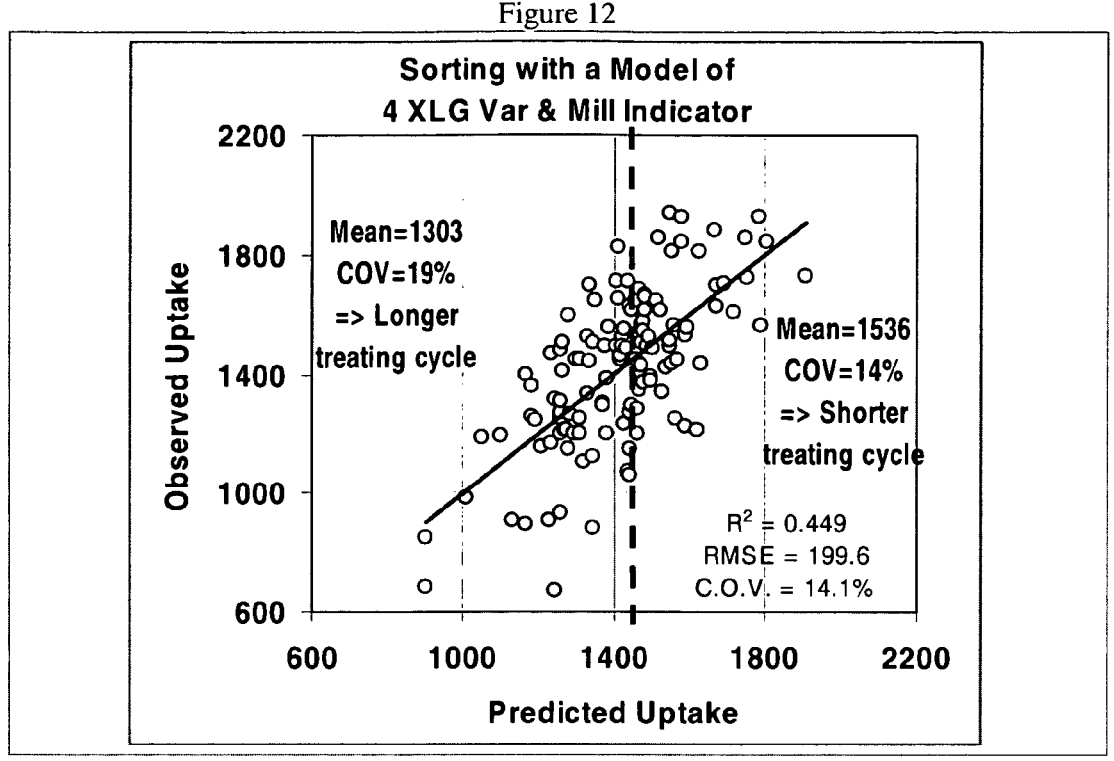
FIG. 12 is a plot of predicted uptake vs. actual uptake.

The model using 4 XLG variables and mill indicator was used to simulate sorting lumber at mill into two batches, more treatable lumber and less treatable lumber. The difference between average uptake of the two batches is 16% of the overall average uptake as shown in FIG. 12. The sorting efficiency should be further improved if sorting is applied to each mill group separately. This could potentially enable a treating manufacturer to customize the treating cycle by scheduling a shorter treating cycle for the more treatable lumber and a longer treating cycle for less treatable lumber; thereby reducing chemical overtreatment of the more treatable lumber group.

Figure 13:
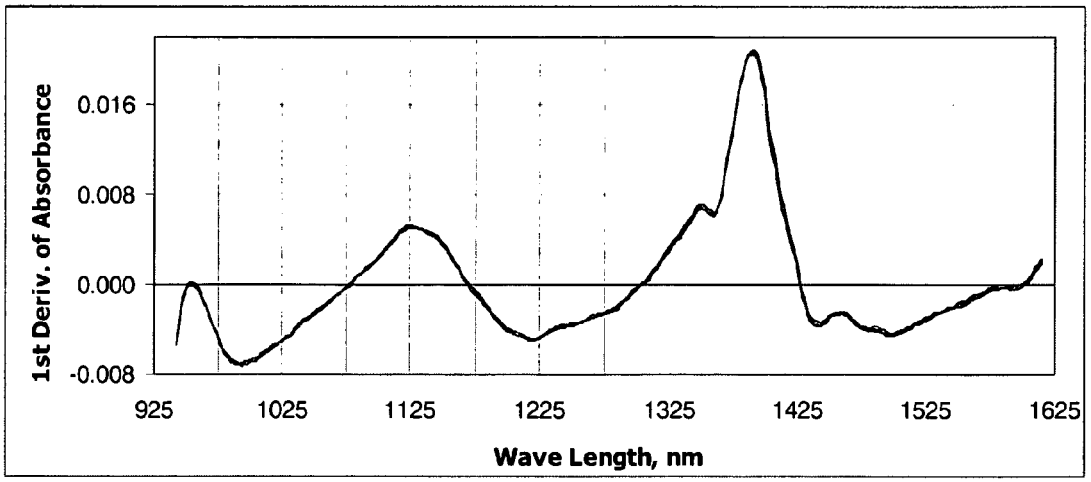
FIG. 13 are plots of 1st derivative of absorbance and $2^{nd}$ derivative absorbance vs. wave length for a 4-ft treating sample.
Figure 13:
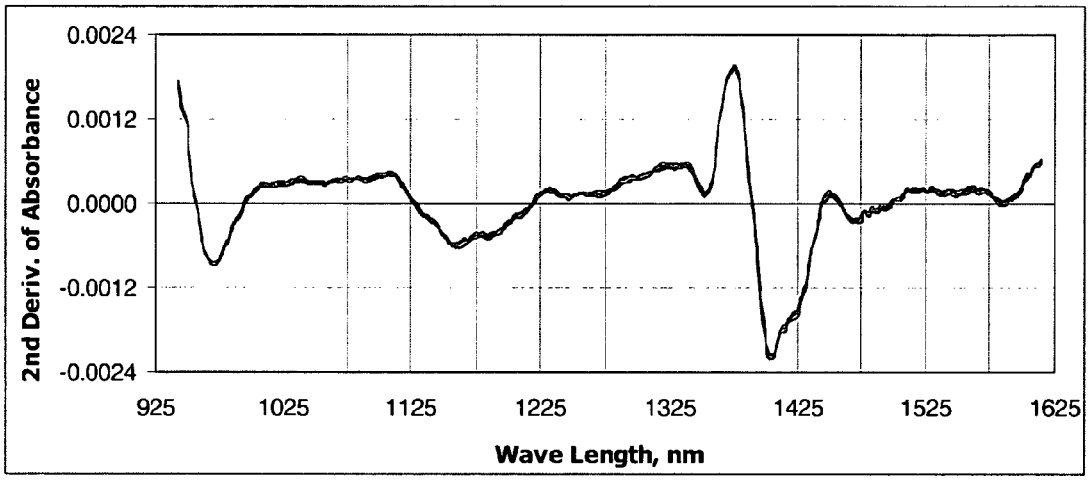
Figure 16:
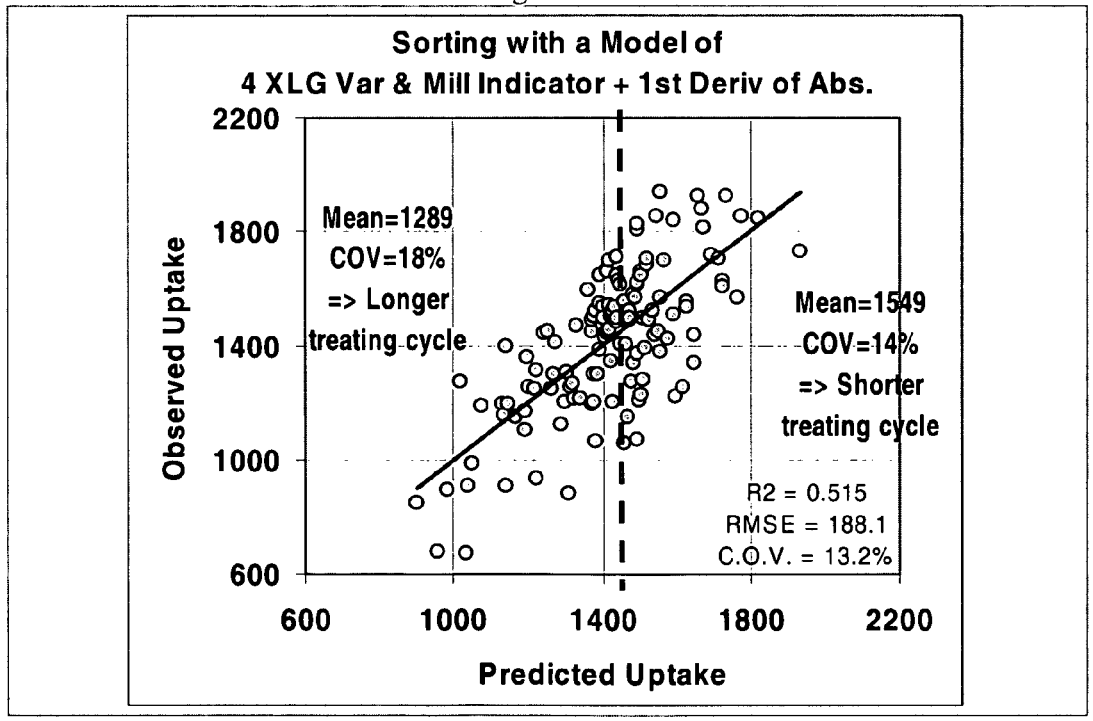
FIG. 16 is a plot of predicted uptake vs. actual uptake.

To improve the prediction of uptake, NIR absorbance data was examined. In analyzing spectral data, it is common practice to look at original (relative) absorbance, 1st derivatives of absorbance—change in absorbance, and 2nd derivatives of absorbance—rate of change in absorbance (refer to FIG. 13, for example). First derivative data is useful in focusing on how absorbance changes, and 2nd derivative data help identify where absorbance makes rapid changes and where absorbance spikes as a peak or valley. First and 2nd derivatives were numerically estimated using the Savitzky & Golay method with 11-point weights.

bance variables at wave lengths in the range of 1188 nm to 1211 nm in combinations, in particular, worked well with the XLG models (see Table 4). Improvement in the model is apparent when the combined model is used for sorting into two batches as shown in FIG. 16; compared to a sort model using only XLG variables, that of FIG. 12. Using the combined model, average uptake difference between the two sorted batches increased to 20% of overall average.

First derivatives of absorbance at 1202 nm and 1198 nm each explained 23% and 21% of uptake variation, respectively. These correlations are slightly better than the best XLG variable, total number of density spikes. Adding one of these 1st derivative variables to the density based models described in Table 2 significantly improves prediction, although the improvements were slightly less than that from addition of two original absorbance variables, as shown in FIG. 16.

Figure 17:
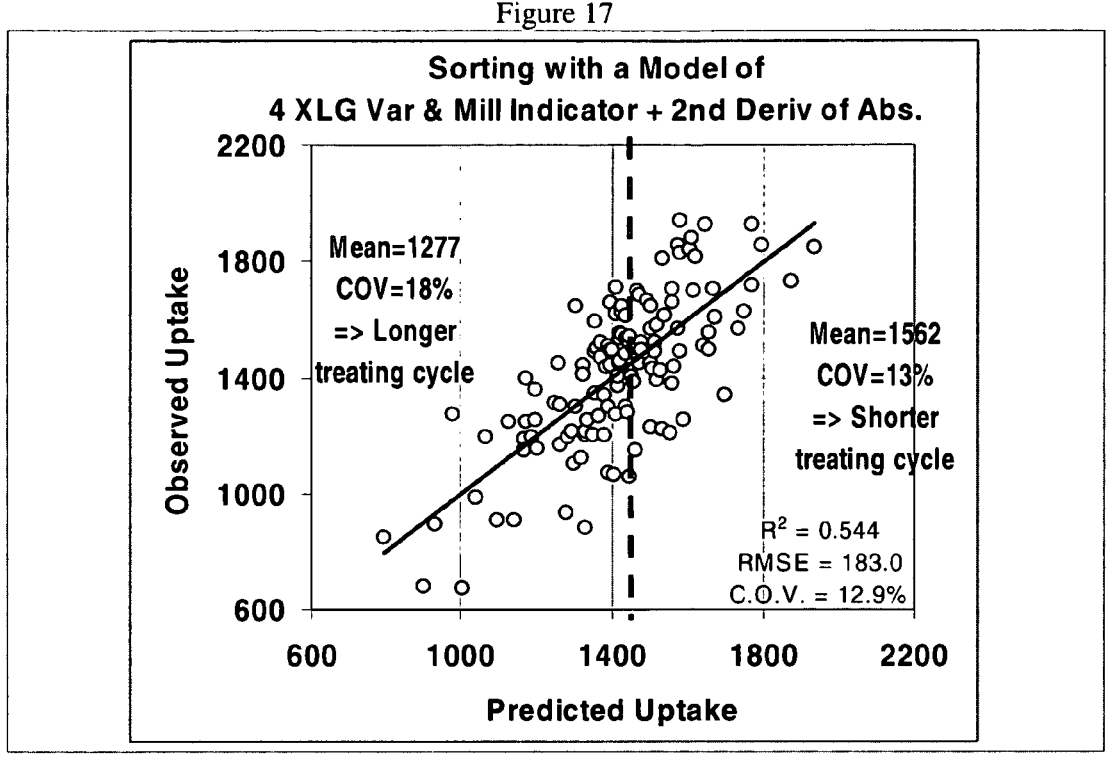
FIG. 17 is a plot of predicted uptake vs. actual uptake.

Second derivatives of absorbance at 1139 nm explained 23% of uptake variation, slightly better than the best XLG variable, total number of density spikes. Adding two wavelengths from the $2^{nd}$ derivative spectra significantly improved the uptake model compared to a model based on density data only ($R^2$=0.55 for combined model vs. $R^2$=0.45 for model based only on density patterns, as in Table 2). The sorting simulation also showed similar improvement with 20% difference between average uptake of the two sorted batches as illustrated in FIG. 17. Table 7 summarizes the statistics of all models referred to among these examples.

TABLE 7

| Predicting Uptake | Models without Mill Group | | | Include Mill Indicator | | |
|---|---|---|---|---|---|---|
| | $R^2$ | RMSE | C.O.V. | $R^2$ | RMSE | C.O.V. |
| A. total # of dens spikes | 0.213 | 230.6 | 16.2% | 0.289 | 220.2 | 15.5% |
| A + absorbance at 1195 nm & 1208 nm-"0 ft" | 0.395 | 203.9 | 14.4% | 0.430 | 198.7 | 14.0% |
| A + 1st derive. of absorb. at 1202 nm-"0 ft" | 0.291 | 219.9 | 15.5% | 0.360 | 210.6 | 14.8% |
| A + 2nd deriv. of absorb. at 1192 & 1323 nm-"0 ft" | 0.315 | 217.1 | 15.3% | 0.404 | 203.2 | 14.3% |
| B. total # of dens spikes, clearwood density-"12-ft" samples | 0.248 | 226.4 | 15.9% | 0.373 | 208.5 | 14.7% |
| B + absorbance at 1195 nm & 1208 nm-"0 ft" | 0.424 | 199.8 | 14.1% | 0.505 | 186.7 | 13.1% |
| B + 1st derive. of absorb. at 1202 nm-"0 ft" | 0.391 | 204.7 | 14.4% | 0.497 | 190.9 | 13.4% |
| B + 2nd deriv. of absorb. at 1192 & 1323 nm-"0 ft" | 0.374 | 208.0 | 14.7% | 0.509 | 186.7 | 13.1% |
| C. Total # of dens spikes, % area with dens diff >0.10-"0-ft" samples, avg overall density, Avg clearwood density | 0.326 | 216.1 | 15.2% | 0.449 | 199.6 | 14.1% |
| C + absorbance at 1192 nm & 1211 nm-"0 ft" | 0.474 | 192.5 | 13.6% | 0.549 | 182.1 | 12.8% |
| C + 1st derive. of absorb. at 1202 nm-"0 ft" | 0.421 | 201.1 | 14.2% | 0.515 | 188.9 | 13.2% |
| C + 2nd deriv. of absorb. at 1192 & 1323 nm-"0 ft" | 0.446 | 197.5 | 13.9% | 0.544 | 183.0 | 12.9% |

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. A method of determining liquid uptake potential in a wood product, the method comprising the steps of:
    creating an algorithm for correlating one or more detected properties of the wood product to liquid uptake potential for the wood product;
    detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps; and
    inputting the one or more detected properties to the algorithm.

2. The method of claim 1 wherein the algorithm provides a qualitative estimate of the liquid uptake.

3. The method of claim 1 wherein the algorithm provides a quantitative estimate of the liquid uptake.

4. The method of claim 1 wherein the liquid is a carrier for other chemicals.

5. The method of claim 1 wherein the one or more sensor groups are in a tomographic imaging configuration.

6. The method of claim 1 wherein the wood product is one of the following: lumber, poles, timbers, veneered products, strand products, engineered products, logs.

7. The method of claim 1 wherein one of the properties of the wood product is heartwood content.

8. A method of determining potential penetration of a liquid into a wood product, the method comprising the steps of:
    creating an algorithm for correlating one or more detected properties of the wood product to the potential penetration of liquid into the wood product;
    detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps; and
    inputting the one or more detected properties to the algorithm.

9. The method of claim 8 wherein the algorithm provides a qualitative estimate of the liquid uptake.

10. The method of claim 8 wherein the algorithm provides a quantitative estimate of the liquid uptake.

11. The method of claim 8 wherein the liquid is a carrier for other chemicals.

12. The method of claim 8 wherein one of the properties of the wood product is heartwood content.

13. A method of determining liquid uptake potential in a wood product, the method comprising the steps of:
- creating an algorithm for correlating one or more detected properties of the wood product to heartwood content for the wood product;
- detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps;
- inputting the one or more detected properties to the algorithm to get the correlated heartwood content; and
- determining the liquid uptake potential based on the correlated heartwood content.

14. The method of claim 13 wherein the liquid uptake potential is determined by a second algorithm which takes into account the correlated heartwood content.

15. The method of claim 13 wherein the second algorithm provides a qualitative estimate of the liquid uptake.

16. The method of claim 13 wherein the second algorithm provides a quantitative estimate of the liquid uptake.

17. A method of determining potential penetration of a liquid into a wood product, the method comprising the steps of:
- creating an algorithm for correlating one or more detected properties of the wood product to heartwood content for the wood product;
- detecting the one or more properties of the wood product wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps;
- inputting the one or more detected properties to the algorithm to get the correlated heartwood content; and
- determining the potential penetration of the liquid into the wood product based on the correlated heartwood content.

18. The method of claim 17 wherein the potential penetration of the liquid into the wood product is determined by a second algorithm which takes into account the correlated heartwood content.

19. The method of claim 17 wherein the second algorithm provides a qualitative estimate of the potential penetration of the liquid into the wood product.

20. The method of claim 17 wherein the second algorithm provides a quantitative estimate of the potential penetration of the liquid into the wood product.

21. A method of manufacturing a wood product from a raw material, the method comprising the steps of:
- creating an algorithm for correlating one or more detected properties of one or more regions of interest in the raw material to treatability for the raw material;
- detecting the one or more properties of the one or more regions of interest wherein the detected properties are determined from one or more sensor groups selected from the group consisting of: wood chemistry pattern measurement, density pattern measurement, spectral transmission or absorption measurement, moisture content measurement, electrical/electromagnetic property measurement, magnetic resonance property measurement, structural property measurement, acousto-ultrasonic property measurement, light scatter (tracheid-effect) measurement, grain angle measurement, shape measurement, color measurement and/or defect maps;
- inputting the one or more detected properties to the algorithm to determine the treatability of the raw material; and
- manufacturing the wood product from the raw material based on the treatability.

22. The method of claim 21 wherein the treatability being determined is liquid uptake potential.

23. The method of claim 21 wherein the treatability being determined is liquid penetration potential.

* * * * *